United States Patent [19]

Umezawa et al.

[11] Patent Number: 5,790,492
[45] Date of Patent: Aug. 4, 1998

[54] CROSSTALK CANCELER WITH DIGITAL FILTER FOR PRODUCING PSEUDO CROSSTALK COMPONENT

[75] Inventors: Masaru Umezawa; Hideki Hayashi, both of Tsurugashima, Japan

[73] Assignee: Pioneer Electronic Corporation, Japan

[21] Appl. No.: 839,345

[22] Filed: Apr. 18, 1997

[30] Foreign Application Priority Data

Jun. 10, 1994 [JP] Japan ................................ 6-129042

[51] Int. Cl.$^6$ ............................................ G11B 7/00
[52] U.S. Cl. .................................... 369/54; 369/124
[58] Field of Search ............................ 369/47–48, 54, 369/58, 111, 124

[56] References Cited

U.S. PATENT DOCUMENTS

| | | | |
|---|---|---|---|
| 5,084,858 | 1/1992 | Maeda | 369/124 |
| 5,153,872 | 10/1992 | Maeda | 369/124 |
| 5,402,403 | 3/1995 | Maeda | 369/58 X |

OTHER PUBLICATIONS

Patent Abstracts of Japan, vol. 14, No. 207, P1043, & JP 2–44573, Apr. 26, 1990.

*Primary Examiner*—W. R. Young
*Attorney, Agent, or Firm*—Nixon & Vanderhye

[57] ABSTRACT

A crosstalk canceler cancels crosstalk components mixed into a reproduced signal of a target track from a first and a second neighboring tracks positioned on both sides of the target track formed on an optical disc. The crosstalk canceler includes: unit for reproducing a signal recorded on the tracks of the optical disc; unit for processing the reproduced signal to produce 1-bit binary data indicating data recorded on the first neighboring track and outputting first binary data; unit for producing a first pseudo crosstalk component which mixes into the reproduced signal of the target track from the first neighboring track based on the first binary data; unit for delaying an output signal corresponding to a pure recorded signal of the track preceding the target track to produce second binary data indicating data recorded on the second neighboring track and outputting second binary data; unit for producing a second pseudo crosstalk component which mixes into the reproduced signal of the target track from the second neighboring track based on the second binary data; and unit for subtracting the first and the second pseudo crosstalk components from the reproduced signal of the target track and outputting a pure recorded signal of the target track.

3 Claims, 8 Drawing Sheets

CROSSTALK CANCELER WITH DIGITAL FILTER FOR PRODUCING PSEUDO CROSSTALK COMPONENT

BACKGROUND OF THE INVENTION

1. Field of the Invention:

This invention relates to a crosstalk canceler, and more particularly to a crosstalk canceler for eliminating crosstalk between neighboring tracks of a high recording density type optical disc utilizing digital signal processing.

2. Description of the Prior Art

When the track pitch of the optical disc is reduced so as to increase the recording density thereof, the light spot irradiated on the target track covers the neighboring tracks, and thereby the crosstalk is generated and mixed into the read-out signal of the target track. In order to overcome this problem, there has been known a crosstalk cancelling technique in which a pseudo crosstalk component is electrically produced and is subtracted from the read-out signal of the target track to obtain the pure signal recorded on the target track. However, such a crosstalk canceler generally requires a complicated and large-scaled circuitry for the production of the pseudo crosstalk component.

SUMMARY OF THE INVENTION

It is an object of the present invention to provide a crosstalk canceler capable of accomplishing satisfactory crosstalk cancelling performance with a simplified circuitry.

According to one aspect of the present invention, there is provided a crosstalk canceler for cancelling crosstalk components mixed into a target track from a first and a second neighboring tracks positioned on both sides of the target track formed on an optical disc. The crosstalk canceler includes: reproducing unit for reproducing a signal recorded on the track of the optical disc; processing unit for processing the reproduced signal to produce 1-bit binary data indicating data recorded on the first neighboring track and outputting first binary data; first crosstalk detecting unit for producing a first pseudo crosstalk component which mixes into the target track from the first neighboring track based on the first binary data; delay unit for delaying the first binary data to produce second binary data indicating data recorded on the second neighboring track and outputting second binary data; second crosstalk detecting unit for producing a second pseudo crosstalk component which mixes into the target track from the second neighboring track based on the second binary data; and subtracting unit for subtracting the first and the second pseudo crosstalk components from the reproduced signal of the target track and outputting a pure recorded signal of the target track.

In accordance with the crosstalk canceler thus configured, the signal of the target track reproduced from the optical disc is supplied to the subtracter. The processing unit produces a 1-bit binary data of the first neighboring track from the reproduced signal, and the delay unit produces a 1-bit binary data of the second neighboring track from the 1-bit binary data of the first neighboring track. The first crosstalk detecting unit produces the first pseudo crosstalk component which indicates crosstalk from the first neighboring track to the target track. Similarly, the second crosstalk detecting unit produces the second pseudo crosstalk component which indicates crosstalk from the second neighboring track to the target track. The subtracting unit subtracts the first and the second pseudo crosstalk components from the reproduced signal of the target track. As a result, the crosstalk components are eliminated and the pure recorded signal of the target track is obtained.

According to another aspect of the present invention, there is provided a crosstalk canceler for cancelling crosstalk components mixed into a target track from a first and a second neighboring tracks positioned on both sides of the target track formed on an optical disc. The crosstalk canceler includes: reproducing unit for reproducing a signal recorded on the track of the optical disc; processing unit for processing the reproduced signal to produce 1-bit binary data indicating data recorded on the first neighboring track and outputting first binary data; first crosstalk detecting unit for producing a first pseudo crosstalk component which mixes into the target track from the first neighboring track based on the first binary data; delay unit for delaying a pure recorded signal of the target track to produce second binary data indicating data recorded on the second neighboring track and outputting second binary data; second crosstalk detecting unit for producing a second pseudo crosstalk component which mixes into the target track from the second neighboring track based on the second binary data; and subtracting unit for subtracting the first and the second pseudo crosstalk components from the reproduced signal of the target track and outputting the pure recorded signal of the target track.

In accordance with the crosstalk canceler thus configured, the signal of the target track reproduced from the optical disc is supplied to the subtracter. The processing unit produces a 1-bit binary data of the first neighboring track from the reproduced signal, and the delay unit produces a 1-bit binary data of the second neighboring track from pure recorded signal of the target track outputted by the subtracting unit. The first crosstalk detecting unit produces the first pseudo crosstalk component which indicates crosstalk from the first neighboring track to the target track. Similarly, the second crosstalk detecting unit produces the second pseudo crosstalk component which indicates crosstalk from the second neighboring track to the target track. The subtracting unit subtracts the first and the second pseudo crosstalk components from the reproduced signal of the target track. As a result, the crosstalk components are eliminated and the pure recorded signal of the target track is obtained.

The nature, utility, and further features of this invention will be more clearly apparent from the following detailed description with respect to preferred embodiments of the invention when read in conjunction with the accompanying drawings briefly described below.

DESCRIPTION OF THE PREFERRED EMBODIMENTS

Description of Typical Crosstalk Canceler

Figure 1A:
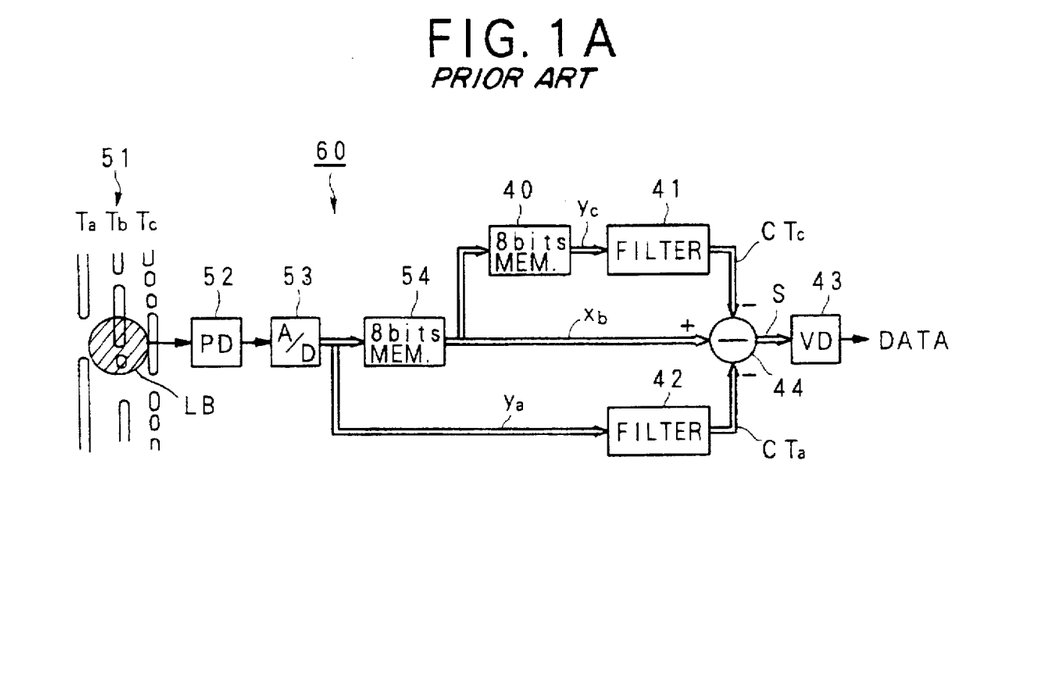
FIG. 1A is a block diagram illustrating a configuration of a typical crosstalk canceler.
Figure 1B:
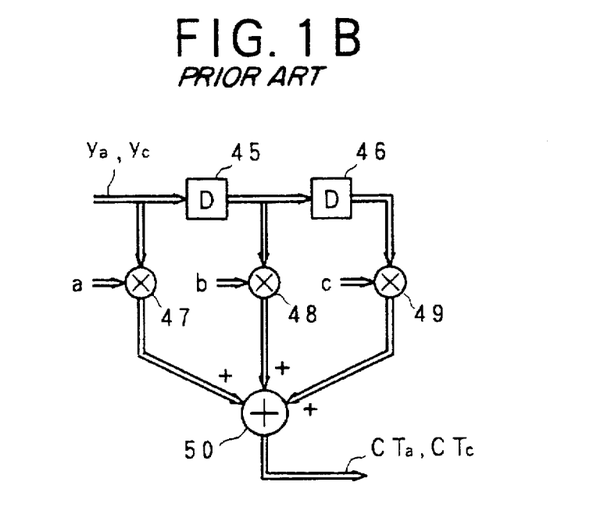
FIG. 1B is a block diagram illustrating a configuration of the filter shown in FIG. 1A.

For a full understanding of the nature and utility of the present invention, a brief consideration of a typical crosstalk canceler will be first presented below with reference to FIGS. 1A and 1B. FIG. 1A illustrates a configuration of a typical crosstalk canceler. As shown, the light spot LB covers not only the target track but also the neighboring tracks positioned on both inner and outer sides of the target track with respect to the radial direction of the optical disc 51, and therefore the crosstalk is generated by the light beam reflected by the neighboring tracks. The photodetector 52 converts the light beam reflected by the optical disc 51 into an electric signal, and the A/D converter 53 converts the electric signal into digital data representative of the magnitude of the electric signal recorded on the track. The signal outputted by the A/D converter 53 is referred to as recorded data $Y_a$ of the track Ta. The 8-bit memory 54 gives the digital data a delay time corresponding to a time period required for reproducing one track of the optical disc (hereinafter referred to as "delay time of one-track", and outputs the delayed data $x_b$ as recorded data of the track Tb. The 8-bit memory 40 further gives a delay time of one-track to the recorded data $x_b$ to produce recorded data $y_c$ of the track Tc. Recorded data $y_c$ is supplied to the filter 41 which filters recorded data $y_c$ to produce the pseudo crosstalk component $CT_c$. Similarly, recorded data $Y_a$ is supplied to the filter 42 which filters recorded data $y_a$ to produce the pseudo crosstalk component $CT_a$. FIG. 1B illustrates a configuration of the filter 41 or 42. The subtracter 44 subtracts the pseudo crosstalk components $CT_a$ and $CT_c$ from recorded data $x_b$ to output a pure recorded data S of the track Tb from which crosstalk components are eliminated. The Viterbi decoder 43 decodes the data S for correcting bit errors or the like.

In the above described crosstalk canceler, recorded data is processed in a form of 8-bits data by the parallel data processing. Accordingly, the delay elements 45 and 46 and the multiplier 47–49 should be designed to perform multi-bit data processing. However, multiplication of multi-bit data requires many adders. When the number of the coefficients is increased, large number of arithmetic elements are required for the pseudo crosstalk component calculation. In addition, memories for delaying recorded data is needed to have large capacity. In this view, the circuit scale should be necessarily enlarged.

Next, preferred embodiments of the present invention will be described below with reference to the accompanying drawings. The following description relates to the cases where the present invention is applied to an optical disc reproduction apparatus employing a single laser beam.

1st Embodiment

Figure 2:
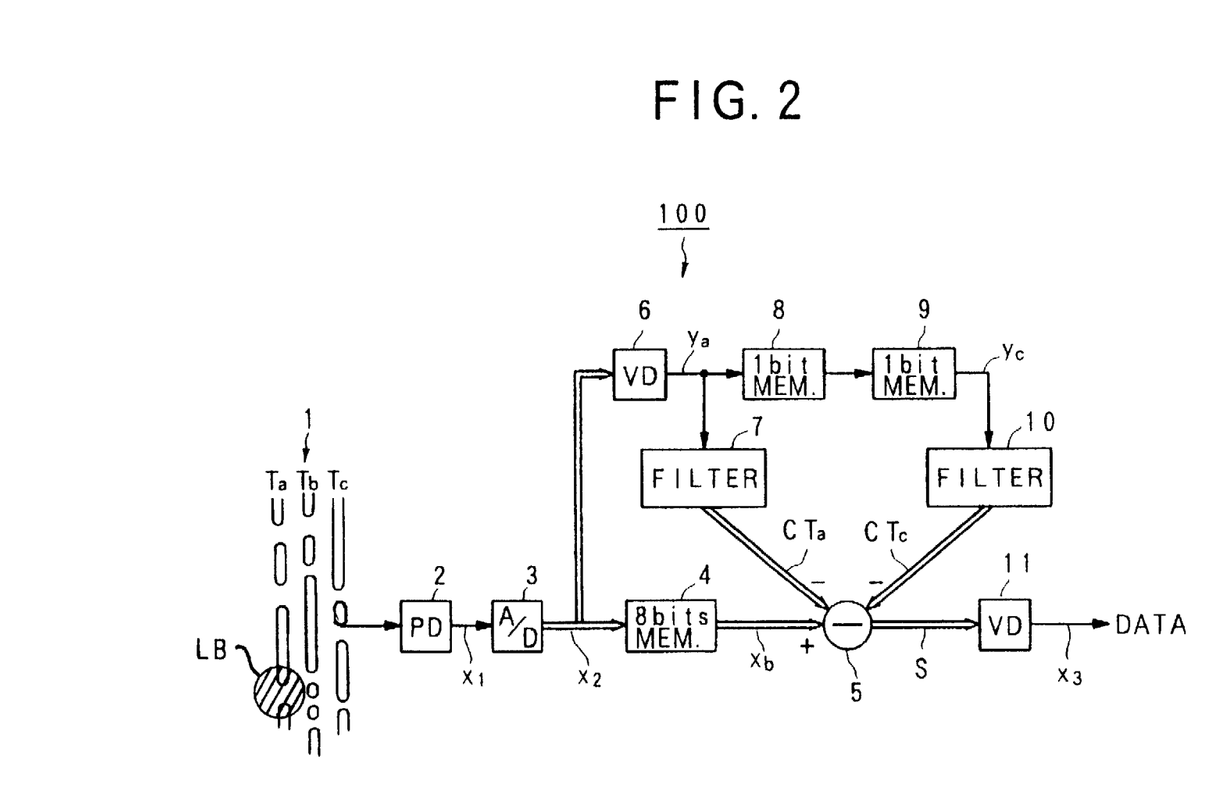
FIG. 2 is a block diagram illustrating a configuration of a crosstalk canceler according to the first embodiment of the present invention.

FIG. 2 illustrates a configuration of a crosstalk canceler according to the first embodiment of the present invention.

The crosstalk canceler 100 eliminates the crosstalk from the signal read out from the optical disc 1. The optical disc 1 is formed with a single track spirally formed (each turns of the spiral track will be hereinafter referred to simply as "track"), and the laser beam is irradiated on the surface of the optical disc 1 by the laser beam source (not shown) so as to form the light spot LB thereon. The photodetector 2 converts the light beam reflected by the optical disc 1 into an electric read-out signal which is an RF signal. The A/D converter 3 converts the RF signal into a digital read-out signal, e.g., 8-bits parallel data representative of the magnitude of the RF signal, by the A/D conversion. The 8-bits memory 4, which may be of FIFO type, stores the read-out data for the capacity of digital data recorded on one track. The 8-bits memory 4 gives a delay time of one-track, i.e., required for the reproduction of one track to the read-out data, and supplies the delayed read-out data to the subtracter 5 as the recorded data $x_b$ of the track Tb. The Viterbi decoder 6 applies the Viterbi decoding to the data $X_2$ to produce a 1-bit data $y_a$. The filter 7 filters the 1-bit data $y_a$ to produce a pseudo crosstalk component $CT_a$ of the track Ta. Each of the 1-bit memories 8 and 9 delays the 1-bit data $y_a$ by the delay time of one-track, respectively, to produce the 1-bit data $y_c$. The filter 10 filters the 1-bit data $y_c$ to produce a pseudo crosstalk component $CT_c$. The subtracter 5 subtracts the pseudo crosstalk components $CT_a$ and $CT_c$ from the data $X_b$. The Viterbi decoder 11 converts the data S from which crosstalk components are eliminated into a 1-bit data $X_3$ and outputs it.

Next, the operation of the crosstalk canceler 100 will be described in more detail. When tracing the track Ta, the light spot LB covers the target track Ta, but the inner and outer edges of the light spot LB also cover the neighboring tracks, thereby the crosstalk is generated and is mixed into the read-out signal supplied to the photodetector 2. Therefore, the data $x_b$ obtained by simply A/D converting and delaying the read-out signal includes the crosstalk components mixed from the neighboring tracks Ta and Tc in addition to the recorded information of the track Tb. The data $x_2$ outputted by the A/D converter 3 represents the magnitude of the read-out signal $x_1$. The data $x_2$ is supplied to the Viterbi decoder 6 in which Viterbi decoding is performed. The data $x_2$ is also supplied to the 8-bits memory 4 to be delayed by the delay time of one-track and outputted as the 8-bits data $x_b$. The 1-bit data $y_a$ outputted by the Viterbi decoder 6 is delayed by the 1-bit memories 8 and 9 by the delay time of two tracks, in total, and is outputted as the 1-bit data $y_c$.

The Viterbi decoder 6 receives the 8-bits data $x_2$ in parallel, and determines a 1-bit data which is assumed to be the recorded data of the target track Tb. Generally, digital data having a specific frequency characteristics is recorded on and reproduced from the optical disc. In many cases, the data reproduced from the optical disc may be dissimilar to the actual recording pattern of the recorded data due to intersymbol interference and affection by noise. The Viterbi decoding can overcome this problem because the Viterbi decoding determines data of maximum likelihood from the successive multi-bits read-out data inputted thereto. Specifically, the Viterbi decoder 6 judges whether the logical value represented by the 8-bits digital data is "1" or "0", and produces a digital data of target track with less data error possibility. The memories 8 and 9 may be constituted by 1-bit Dynamic RAMs or FIFO memories which delay the digital signal. In this way, the data $y_a$, $x_b$ and $y_c$ have such an interrelation in time as the read-out data simultaneously obtained from three tracks at the positions aligned in a radial direction of the optical disc.

Figure 5:
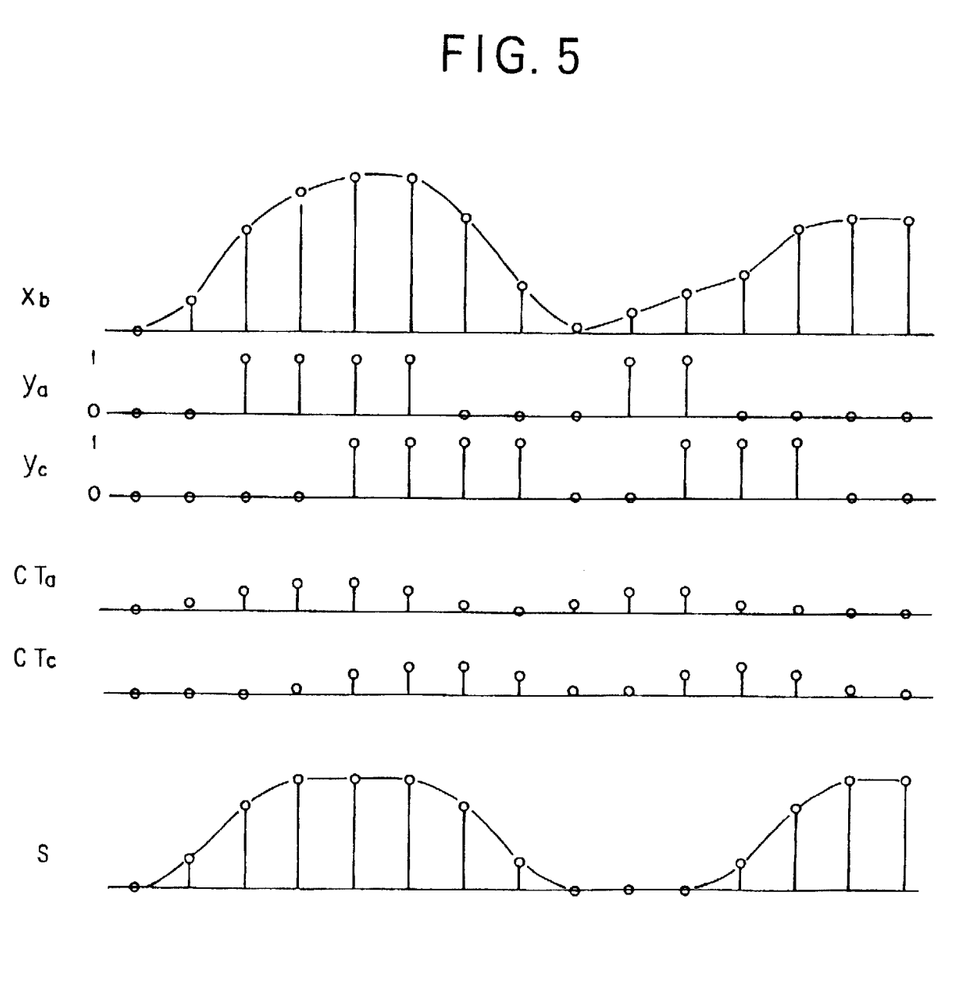
FIG. 5 is a diagram illustrating data processed in the crosstalk canceler shown in FIG. 2.

FIG. 5 illustrates data processed in the crosstalk canceler shown in FIG. 2. The 8-bits data $x_b$ includes crosstalk component, and indicates magnitude level of the RF signal $x_1$. The data $y_a$ has sampled values of "1" or "0" which corresponds to the information recorded on the track Ta. The data $y_c$ represents data read out two rotation before, that is, the recorded data of the track Tc on the other side of the track Ta. The crosstalk component in the data $x_b$ is generated by the intermixture of the data $y_a$ and $y_c$ into the data $x_b$ of the track Tb. The crosstalk component therefore has strong correlation with the data $y_a$ and $y_c$, and therefore pseudo crosstalk components, which intermixes into the data of the track Tb from the tracks Ta and Tc, can be produced from the data $y_a$ and $y_c$ by filtering process of the digital filter. The filters 7 and 10 perform this function. The filter for producing pseudo crosstalk component may be configured in various forms as described below.

Figure 3A:
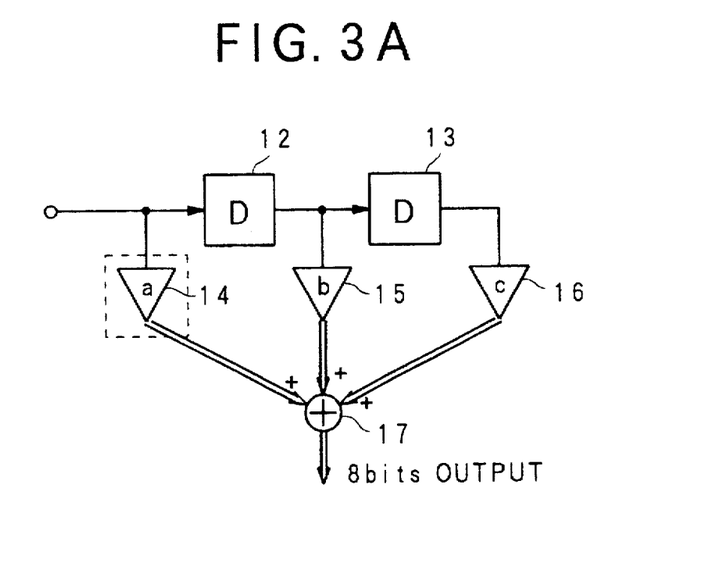
FIG. 3A is a block diagram illustrating a configuration of an example of the digital filter shown in FIG. 2.
Figure 3B:
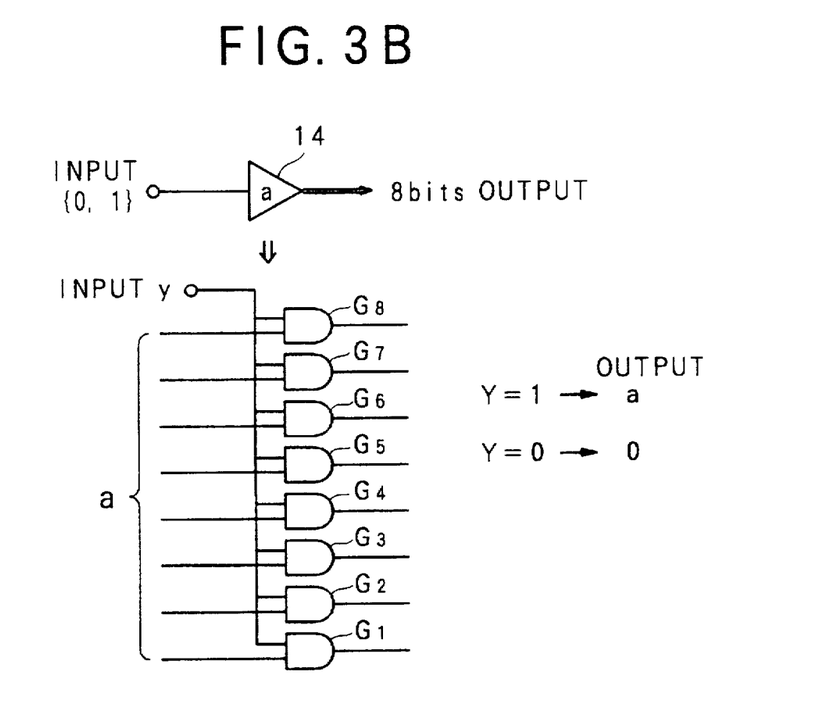
FIG. 3B is a diagram illustrating the circuit configuration of the coefficient multiplier shown in FIG. 3A.

(a) Digital Filter:

FIG. 3A illustrates a configuration of digital filter for producing the pseudo crosstalk component which is employed as the filters 7 and 10, and FIG. 3B illustrates the circuit configuration of the coefficient multiplier 14 shown in FIG. 3A. In FIG. 3A, the reference numerals 12 and 13 denote delay elements, the reference numerals 14–16 denote coefficient multipliers and the reference numeral 17 denotes an adder. The delay elements 12 and 13 may be constituted by Flip-Flop circuits which operate binary data. The coefficient multipliers 14–16 multiply the digital data $y_a$ or $y_c$ by coefficients (e.g., "a" in multiplier 14) using the gate circuits $G_1$–$G_8$ shown in FIG. 3B. By determining appropriate coefficients "a"–"c", the pseudo crosstalk components can be obtained from the digital data $y_a$ and $y_c$. On the assumption that the frequency characteristics between signals of the neighboring tracks is stable, the filter coefficients may be fixed. In addition, an adaptive transversal filter may be employed in order to precisely adapt the filter coefficients to various types of optical discs. In such a case, the filter coefficients are calculated from the digital data read out from the target track and the neighboring tracks. Specifically, when the transversal filter is applied to this embodiment, an operation unit for operating the filter coefficient is employed to calculate the filter coefficient from the data $x_b$ and the data of the neighboring tracks, and the coefficients "a"–"c" in FIG. 3B are renewed.

The pseudo crosstalk components $CT_a$ and $CT_b$ from the tracks Ta and Tc thus obtained are illustrated in FIG. 5. They are 8-bits digital data representative of the magnitudes of the pseudo crosstalk components thus calculated. The subtracter 5 subtracts the pseudo crosstalk components $CT_a$ and $CT_c$ from the data $x_b$ which includes the actual crosstalk components, and outputs the data S indicative of the pure recorded data of the target track Tb. The Viterbi decoder 11 conducts Viterbi decoding onto the data S to obtain the data having maximum likelihood from the data S and outputs the serial data having less error components. It is noted that the Viterbi decoder 11 may be omitted when the parallel data S is directly processed by following processing units.

(b) Filter of Partial Response system:

The filter for producing pseudo crosstalk component may be further simplified when the Partial Response system is introduced to the recording/reproduction system. As a general knowledge, in digital data transmission, intersymbol interference takes place in the transmitted signal on the reception side, and the degree of the intersymbol interference increases as the transmission rate is increased. This is true for the digital data recording on the optical disc. Namely, as the recording density becomes high, the degree of the intersymbol interference increases. The Partial Response system utilizes the intersymbol interference positively. That is, in the Partial Response system, the recording and reproduction system is designed to have a prearranged interference characteristics to give the intentionally-designed intersymbol interference to the reproduced data. Since the characteristics of the intersymbol interference is thus known, it can be eliminated from the reproduced data by an appropriate data processing. In this way, the recording density of the optical disc may be improved with the aid of the Partial Response system. The characteristics of the intersymbol interference has been researched so as to adapt the system to various types of recording and reproduction systems. In this embodiment, Partial Response system PR(1, 1) and PR(1,2,1) are utilized for the recording and reproduction system of the optical disc. PR(1,1) indicates the system in which the sampled data at the time t=0 gives a positive interference of equal magnitude to the sampled data at the time t=T. PR(1,2,1) indicates the system in which the sampled data at the time t=0 gives a positive interference of twice magnitude to the sampled data at the time t=T and a positive interference of equal magnitude to the sampled data at the time t=2T.

Figure 4A:
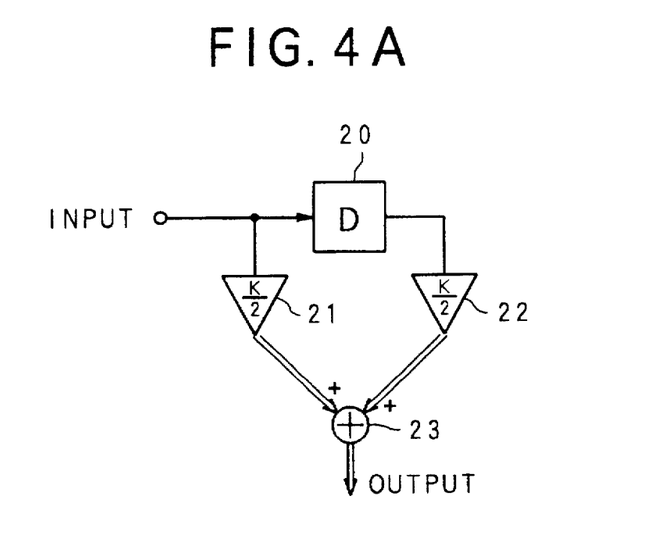
FIGS. 4A and 4B are block diagrams illustrating the configuration of the other examples of the filters shown in FIG. 2.
Figure 4B:
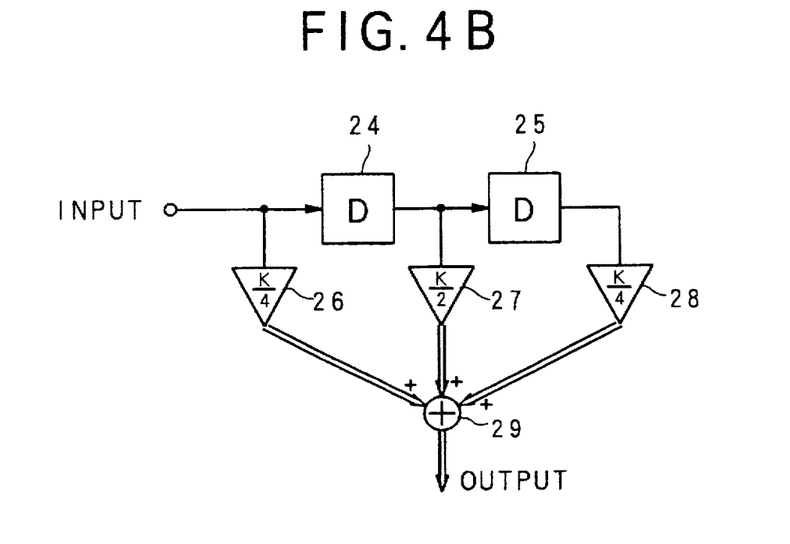

FIGS. 4A and 4B illustrate the configurations of the filters for producing pseudo crosstalk component where the partial response system is applied to the recording and reproduction system. FIG. 4A is the filter for the system PR(1,1) and FIG. 4B is the filter for the system PR(1,2,1). As shown in FIG. 4A, the filter for producing the pseudo crosstalk component for the system PR(1,1) can be constituted by a delay element 20, multipliers 21 and 22 for multiplying the same coefficients and an adder 23. In the similar manner, the filter for producing the pseudo crosstalk component for the system PR(1,2,1) can be constituted by a delay elements 24 and 25, multipliers 26–28 and an adder 29, as shown in FIG. 4B. If the coefficients of the respective multipliers 26–29 are determined to be exponential value of 2 (i.e., $2^n$), the multipliers may be constituted by simple bit-shifting circuits including registers. In this examples of FIGS. 4A and 4B, the multipliers 21, 22 and 27 multiply the coefficient ½, and the multipliers 26 and 28 multiply the coefficient ¼. The data $y_a$ and $y_c$ are filtered by the filters 7 and 10, respectively. The subtracter 5 subtracts the pseudo crosstalk components $CT_a$ and $CT_c$ from the data $x_b$ which includes the actual crosstalk components, so as to output the pure recorded data S from which the crosstalk components are eliminated.

(c) Filter utilizing look-up table:

A filter utilizing a look-up table may also be employed as the filter for producing the pseudo crosstalk component. Specifically, the filters 7 and 10 are constituted by storage devices such as ROM. Namely, the crosstalk components corresponding to the data outputted by the Viterbi decoder 6 are calculated, in advance, and stored in the ROM. In storing the crosstalk components thus calculated in the ROM, the data outputted by Viterbi decoder 6 is used as the address data for storing the crosstalk components. When the data from the Viterbi decoder 6 is supplied to the filters, the crosstalk components stored therein in correspondence with the data, as address, is read out as the appropriate crosstalk components. The crosstalk components thus read out may be directly supplied to the subtracter 5.

As described above, according to the first embodiment, the pseudo crosstalk components can be produced by a simple circuit, without employing multi-bits multipliers or the like, and therefore the scale of the circuit may be reduced. In addition, since the 1-bit memories can be used as the delay units to obtain the data of the neighboring tracks, total cost of the apparatus may be low. Further, an area occupied by the memories on the circuit board may be reduced and hence the whole size of the apparatus may be small. For example, assuming that a single track of the optical disc records 2M bits data, the A/D converted data become 16M bits (=2M×8 bits), and hence a large capacity memory more than 16M bits must be employed. In contrast, according to this embodiment, one 8-bit memory and two 1-bit memories, about 20M bits in total, suffice the necessary storage capacity, and the total storage capacity may be approximately halved. This difference in total storage capacity becomes larger, as the recording capacity of a single track increases. This gives negligible affection in total cost because such a large capacity memory costs very high. Still further, since the Viterbi decoders are used to obtain the binary data of the neighboring tracks, bit error rate may be improved.

2nd Embodiment

Figure 6:
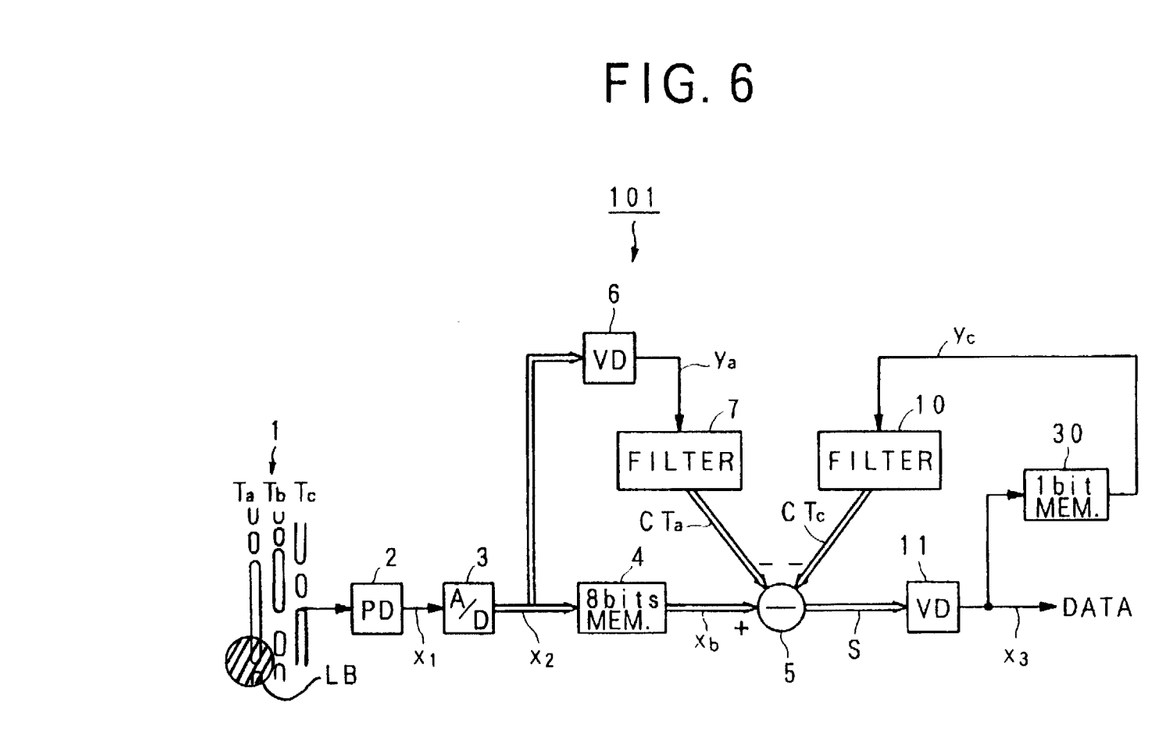
FIG. 6 is a block diagram illustrating a configuration of the crosstalk canceler according to the second embodiment.

The second embodiment described below produces the pseudo crosstalk components of the neighboring tracks from the recorded data of the target track. FIG. 6 illustrates a configuration of the crosstalk canceler according to the second embodiment. As shown in FIG. 6, the crosstalk canceler 101 eliminates the crosstalk components from the data read out from the optical disc 1. In FIG. 6, components identical to those shown in FIG. 2 are applied with the identical reference numerals and the description thereof will be omitted, for the sake of brevity. As seen from FIGS. 2 and 6, the crosstalk canceler 101 differs from the crosstalk canceler 100 in that the filter 10 receives the output data of the Viterbi decoder 11 via the 1-bit memory 30. The 1-bit memory 30 stores the 1-bit data $x_3$ outputted by the Viterbi decoder 11, gives the delay time of one track to it and then outputs the delayed data as the 1-bit data $y_c$ representing the information recorded on the track Tc.

Next, the operation of the crosstalk canceler 101 will be described. The data $x_2$ is supplied to the Viterbi decoder 6 which judges the binary value of the 8-bits data $x_2$ and outputs the 1-bit data $y_a$. The filter 7 produces the pseudo crosstalk data $CT_a$ from the 1-bit data $y_a$, and the subtracter 5 subtracts the pseudo crosstalk component $CT_a$ from the data $x_b$ to output the data S. The Viterbi decoder 11 detects the magnitude of the data S and outputs the data $x_3$ which has maximum likelihood for the magnitude of the data $x_b$. The 1-bit memory 30 delays the data S and the filter 10 produces the pseudo crosstalk component $CT_c$ indicating the crosstalk components from the track Tc. In this way, the pseudo crosstalk components $CT_a$ and $CT_c$ are produced and subtracted from the data $x_b$ to output the binary data $x_3$ which indicates the pure recorded data of the target track Tb.

As described above, according to the second embodiment, the delay function to obtain the data of the neighboring tracks can be accomplished only with one 1-bit memory, and therefore the total storage capacity may be further reduced.

3rd Embodiment

Figure 7:
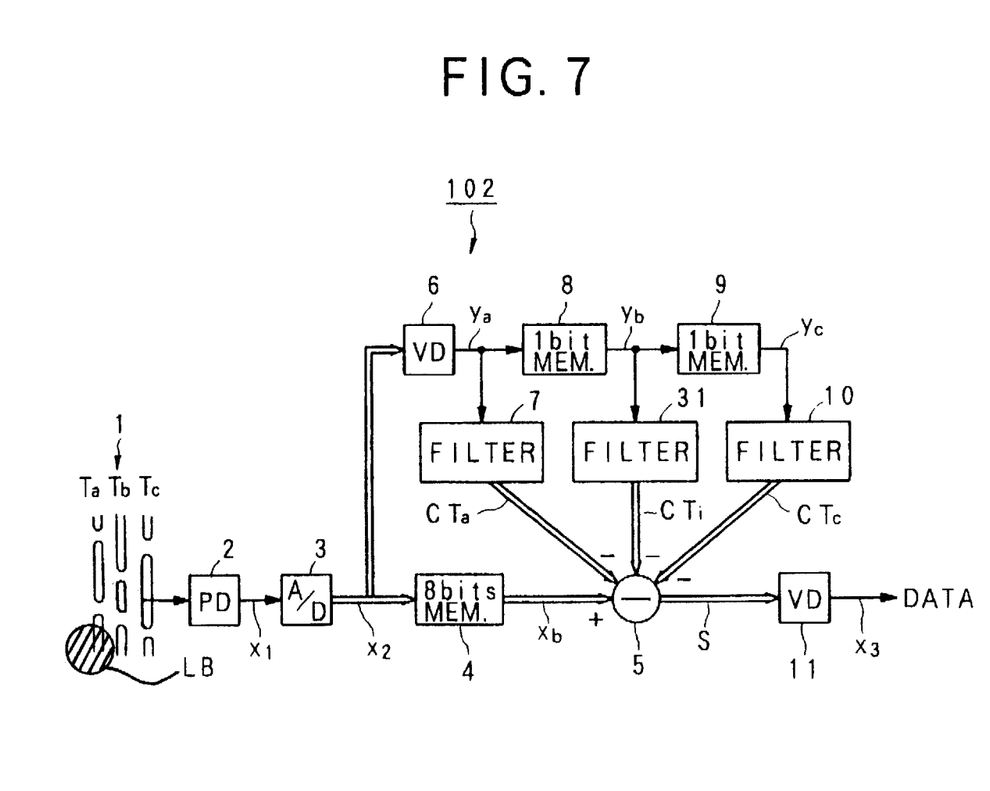
FIG. 7 is a block diagram illustrating a crosstalk canceler according to the third embodiment.
Figure 8A:
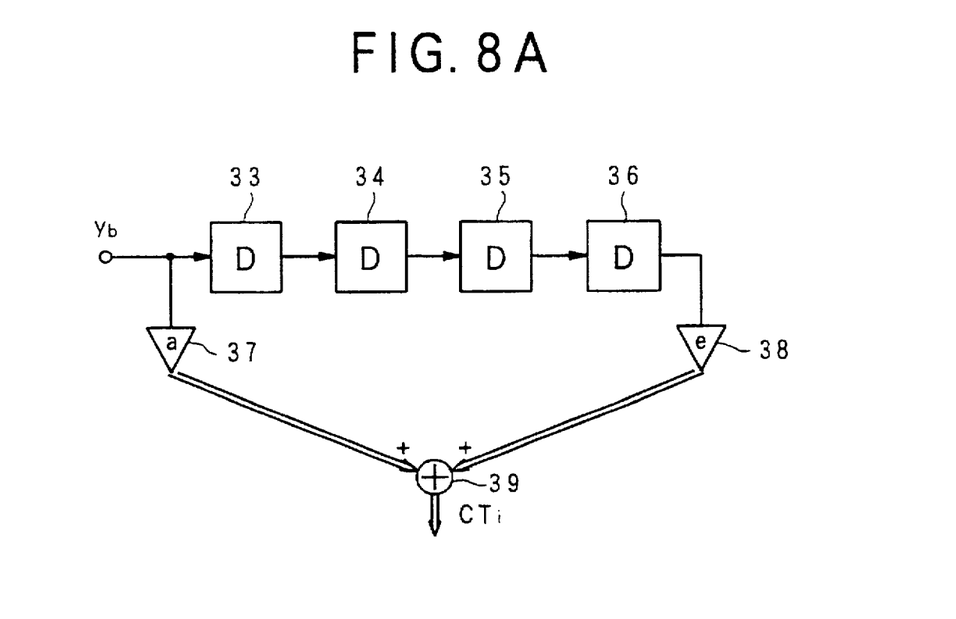
FIG. 8A is a block diagram illustrating a configuration of the intersymbol interference filter shown in FIG. 8A.

The third embodiment aims to eliminate the intersymbol interference generated between the sampled data successively obtained, i.e., interference between successive data in the tangential direction of the disc, as well as the crosstalk components generated between the neighboring tracks in the radial direction of the disc. FIG. 7 illustrates the crosstalk canceler 102 according to the third embodiment. In comparison with the crosstalk canceler shown in FIG. 2, in the crosstalk canceler 102, the intersymbol interference filter 31 is provided between the intermediate point of the 1-bit memories 8 and 9 and the subtracter 5. The intersymbol interference filter 31 receives the data $y_b$, produces the pseudo intersymbol interference component and supplies it to the subtracter 5. The other components are identical to those shown in FIG. 2, and hence the description thereof will be omitted. FIG. 8A illustrates the configuration of the intersymbol interference filter 31. The intersymbol interference filter 31 includes delay elements 33-36 for delaying the data by a predetermined delay time, respectively, multipliers 37 and 38 for multiplying the data by coefficients and an adder 39 for producing a pseudo intersymbol interference component $CT_i$.

Figure 8B:
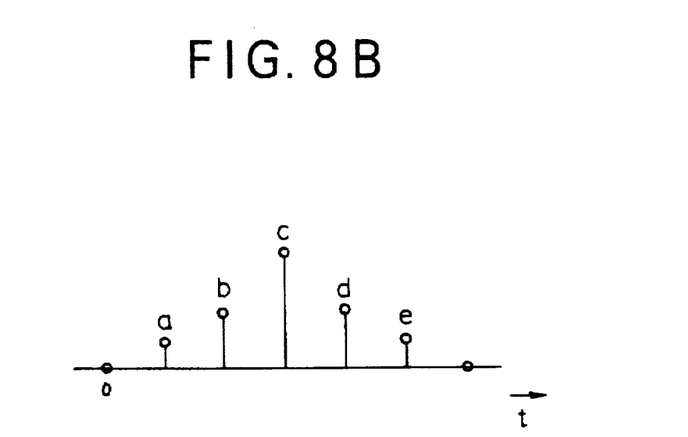
FIG. 8B is a diagram illustrating an impulse response of the crosstalk canceler shown in FIG. 7.

Next, the operation of the crosstalk canceler 102 will be described. It is now assumed that the intersymbol interference class 2 (i.e., PR(1,2,1)) is introduced to the recording and reproduction system, and that the recording and reproduction system has a specific impulse response as shown in FIG. 8B. FIG. 8B illustrates a response of an impulse applied to the recording and reproduction system at the time t=0. Referring to FIG. 8B, only the data "b", "c" and "d" can be decoded by the Viterbi decoder and the magnitude of the data "a" and "e" indicate the intersymbol interference. The intersymbol interference deteriorates the judgement accuracy by the Viterbi decoding which produces the binary data. The output data of the 1-bit memory 8 represents the data recorded on the track Tb, and the intersymbol interference filter 31 produces the pseudo interference component from the data $y_b$. Namely, the intersymbol interference filter 31 produces the pseudo interference component $CT_i$ corresponding to the data "a" and "e" shown in FIG. 8B from the data $y_b$. The transversal filter shown in FIG. 8A has a filter response to output data corresponding to only data "a" and "e" in response to impulse signal inputted thereto. Therefore, the output $CT_i$ of the intersymbol interference filter 31 indicates the pseudo intersymbol interference between successive data recorded on the target track Tb. The subtracter 5 subtracts the pseudo interference component $CT_i$ from the data $x_b$ as well as the pseudo crosstalk components $CT_a$ and $CT_c$, thereby eliminating the intersymbol interference from the data $x_b$. The Viterbi decoder 11 produces the data $X_3$ from the data S from which crosstalk components and intersymbol interference component are eliminated.

As described above, according to the third embodiment, the intersymbol interference generated in the track direction can be eliminated by simply providing the crosstalk canceler of the first embodiment with the intersymbol interference filter. Since the crosstalk and interference components in both radial and tangential directions of the disc may be thus eliminated, this embodiment is preferably applicable to the reproduction apparatus for an optical disc of high recording density type.

The present invention may be embodied in other various specific forms. For example, although the data is processed in 8-bits unit in the above embodiments, it may be processed as 16- or 24-bits data. In a system in which the intersymbol interference is not so serious, the introduction of the Partial Response system is unnecessary. Further, when the Partial Response system is introduced, the system of other classes such as PR(1,0,-1) or PR(1,1,-1,-1) may be used. In order to obtain the binary data of the neighboring tracks, not only the Viterbi decoder but binary decoders of other types may be employed.

As described above, according to the present invention, the pseudo crosstalk component can be calculated by a simple circuit. Therefore, the total storage capacity of memory section may be reduced, thereby reducing the scale and cost of the device remarkably.

What is claimed is:

1. A crosstalk canceler for canceling crosstalk components mixed into a reproduced signal of a target track from a first and a second neighboring tracks positioned on both sides of the target track formed on an optical disc, said crosstalk canceler comprising:

reproducing means for reproducing a signal recorded on the tracks of the optical disc;

processing means for processing the reproduced signal to produce 1-bit binary data indicating data recorded on the first neighboring track and outputting first binary data;

first crosstalk detecting means for producing a first pseudo crosstalk component which mixes into the reproduced signal of the target track from said first neighboring track based on the first binary data;

delay means for delaying an output signal corresponding to a pure recorded signal of the track preceding the target track to produce second binary data indicating data recorded on the second neighboring track and outputting second binary data;

second crosstalk detecting means for producing a second pseudo crosstalk component which mixes into the reproduced signal of the target track from said second neighboring track based on the second binary data; and subtracting means for subtracting the first and the second pseudo crosstalk components from the reproduced signal of the target track and outputting the pure recorded signal of the target track.

2. A crosstalk canceler according to claim 1, wherein said reproducing means comprises reading means for reading out the signal recorded on the tracks; and digitizing means for digitizing the read-out signal into multi-bits digital data, and said processing means comprises decoding means for decoding the multi-bits digital data into 1-bit binary data.

3. A crosstalk canceler according to claim 2, wherein said decoding means comprises a Viterbi decoder for producing 1-bit binary data which indicates value of the inputted multi-bits data having maximum likelihood.

* * * * *